E. S. WOODS & T. H. ALFREDS.
A. G. WELCH, EXECUTOR OF E. S. WOODS, DEC'D.
ANTIFRICTION BEARING.
APPLICATION FILED APR. 18, 1913.
1,168,364.
Patented Jan. 18, 1916.
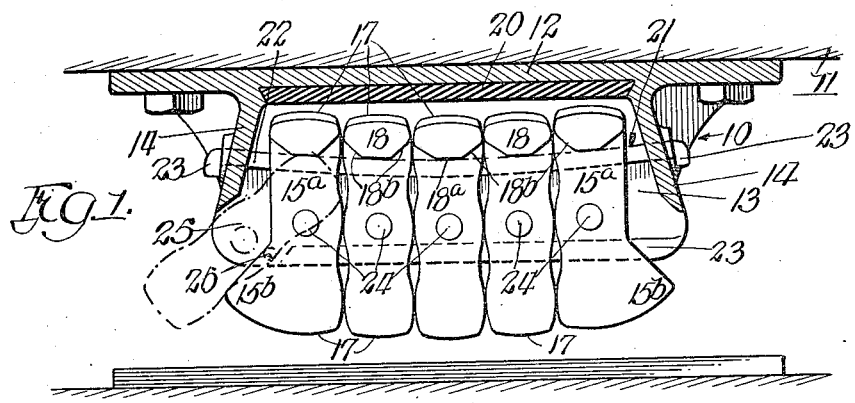
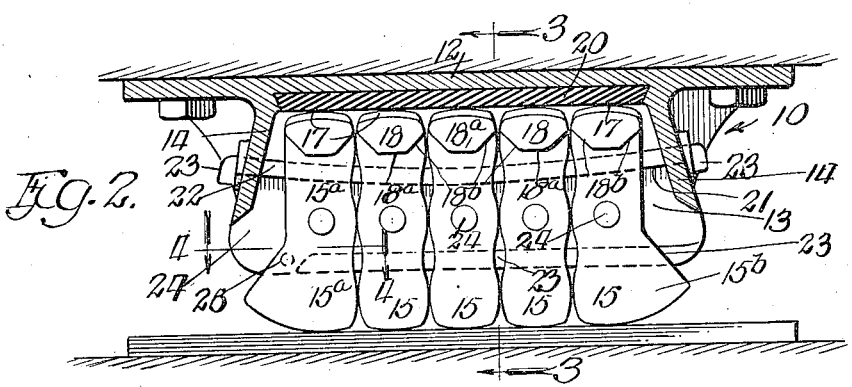
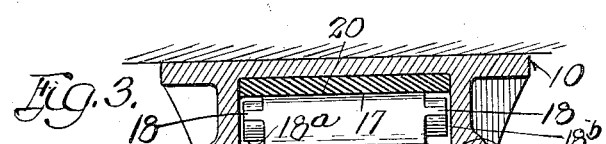
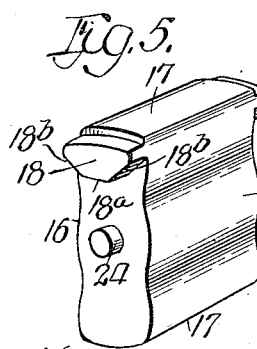
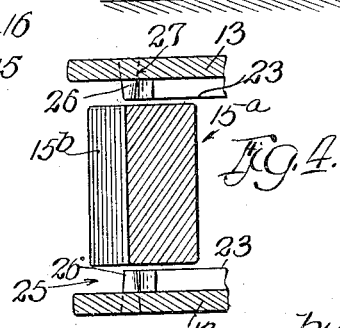
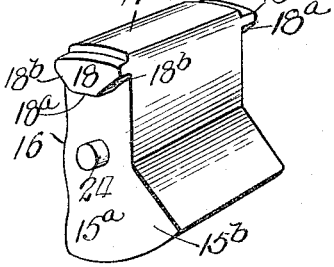

UNITED STATES PATENT OFFICE.

EDWIN S. WOODS AND TORRIS H. ALFREDS, OF CHICAGO, ILLINOIS; SAID ALFREDS ASSIGNOR TO SAID WOODS; ALBERT G. WELCH, EXECUTOR OF SAID WOODS, DECEASED, ASSIGNOR TO ALBERT G. WELCH, TRUSTEE.

ANTIFRICTION-BEARING.

1,168,364.          Specification of Letters Patent.          Patented Jan. 18, 1916.

Application filed April 18, 1913. Serial No. 761,896.

*To all whom it may concern:*

Be it known that we, EDWIN S. WOODS and TORRIS H. ALFREDS, citizens of the United States, and residents of Chicago, in the county of Cook and State of Illinois, have invented certain new and useful Improvements in Antifriction-Bearings; and we do hereby declare that the following is a full, clear, and exact description thereof, reference being had to the accompanying drawings, and to the letters of reference marked thereon, which form a part of this specification.

This invention relates to improvements in antifriction bearings and is shown herein as applied to antifriction side bearings for railroad cars.

The invention consists of the matters hereinafter described and more particularly pointed out in the appended claims.

In the drawings:—Figure 1 is a view representing a central longitudinal section through our improved side bearing showing the antifriction elements as they appear freely suspended within the casing when the bearing is not transmitting load. Fig. 2 is a like sectional view showing the antifriction elements as they appear when the bearing is transmitting load. Fig. 3 is a view representing a transverse section through the bearing in a plane indicated by the line 3—3 of Fig. 2. Fig. 4 is a view representing a fragmentary horizontal section through Fig. 2 in a plane indicated by line 4—4 thereof. Fig. 5 is a perspective view of one of the intermediate antifriction elements. Fig. 6 is a perspective view of one of the end antifriction elements.

Our improved antifriction bearing is of the type which includes a plurality of closely spaced or closely nested, flat sided antifriction elements designed to rock in unison when the parts between which they transmit load move relatively to each other.

Referring now to that embodiment of our invention illustrated in the drawings,—10 indicates a casing designed for attachment to the body bolster 11 of a car and adapted to contain and support the antifriction elements of the bearing. Said casing has an integral top wall 12, parallel side walls 13, 13, and outwardly and downwardly inclined end walls 14, 14. The top wall 12 projects at its ends and sides beyond the end and side walls of the casing to provide suitable flanges for the bolts or screws by means of which the casing is attached to the body bolster.

15 indicates a plurality of flat sided antifriction elements suspended within the casing, 15$^a$ denoting the end ones of the set of antifriction elements. Said antifriction elements have substantially flat sides 16, 16 and as shown are of much greater height than width. They also have top and bottom rounded bearing surfaces 17, 17, adapted for rolling or rocking movement against the surfaces of the two parts between which they transmit load. The end antifriction elements 15$^a$ are extended laterally near the bottom on the outer side to provide an overweight part 15$^b$ the purpose of which will presently appear. The bottom rolling surface of each of said end antifriction elements is continued on the same radius throughout the extent of this overweight extension 15$^b$.

Each of the antifriction elements is provided near the top with end extensions 18, 18 which constitute trunnions for the suspension of the antifriction element in the casing. A wear-plate 20 of hardened metal is secured in the top of the casing in a familiar manner to provide a bearing surface for the antifriction elements.

In each side wall 13 of the casing there is provided a longitudinally extending groove 21 which is inclined or curved slightly downward from each end of the casing toward the middle thereof. Said grooves open through the end walls of the casing.

22 indicates steel bars which are inserted through the holes in the end walls of the casing into the grooves 21, said bars being driven in from one end and being of a length such that they will project beyond both end walls of the casing so as to provide end parts 23 which may be bent down against said end walls and thus lock the bars in the casing. The bars are of such width as to project inwardly from the side walls of the casing to provide rails for engagement with the trunnions 18 of the antifriction elements whereby said antifriction elements are suspended within the casing when not transmitting load.

The side walls of the casing are provided at their bottom edges with inturned flanges 23 which constitute supplemental rails and each antifriction element is provided at its ends with supplemental trunnions 24 which are so placed that when the regular trunnions 18 and the associated rails 22 support the antifriction elements, the supplemental trunnions will be on a level above the supplemental rails 23, as shown in Fig. 1. Should, however, either the regular trunnions or any antifriction element or their associated rails become broken, said antifriction element instead of falling from the casing, will be caught by means of the supplemental trunnions 24 and supplemental rails 23. This will prevent the loss of any of the antifriction elements in the event of such breakage of the top trunnions or of their rails.

The bottom rails 23 one the side wall of the casing each terminate short of one end wall of the casing to leave spaces 25 at each side of the casing between said rails and the proximate end wall 14 of the casing. By reason of these spaces the antifriction elements may be introduced one by one through the end of the casing before the bars 22 are inserted in said casing. In assembling the bearing the antifriction elements are introduced one by one in this way until they are all in the casing and the casing is then turned up-side-down so as to remove the upper trunnions 18 of the antifriction elements as far from the position to be occupied by the rail 22 as possible. Said rails are then driven into place in the casing and their end parts bent downwardly as illustrated in the drawings. After the elements are thus in place and to further confine them in the casing, pins 26 are driven through suitable apertures 27 in the side walls of the casing, which apertures are so located that said pins when in place will constitute extensions of the supplemental rails 23 so placed with reference to the proximate end wall of the casing, that the antifriction elements, even with the bars 22 broken or removed, cannot be withdrawn through the spaces left between said pins and end walls.

When the antifriction elements are caused to rock toward one or the other end of the casing by reason of their engagement between the relatively moving body and truck bolsters and when the said antifriction elements are released from load and are thus left in an inclined position, gravity will cause the elements to drop until the upper trunnions 18 come to bear on the rails 22 and as said trunnions are located above the centers of gravity of the antifriction elements, said antifriction elements will swing pendulumwise into their normal vertical position. This movement of the antifriction elements will be assisted by reason of the fact that the end antifriction elements are overweighted on one side so that said end antifriction elements by reason of the increased momentum, due to its overweighted part, will act to increase the force tending to swing said antifriction elements toward a vertical position.

The trunnions 18, as shown herein, are provided with flat sides $18^a$ on the bottom which act to maintain them or rather the antifriction elements carried by them, in vertical position and thus prevent them from rattling about in the casing. Said trunnions are also provided at each side of the flat bottom side with inclined sides $18^b$ which intersect said flat bottom sides in straight lines, which act as fulcrums when the antifriction elements drop to suspended position on the rail 22 and about which the antifriction elements swing in assuming their normal vertical position. After the antifriction elements have assumed a vertical position, the inclination of the rails 22 downwardly toward the center of the casing causes said elements to gravitate in that direction, their trunnions sliding on said rails. Thus by reason of the inclination of the rails 22 the antifriction elements when suspended in the casing and not transmitting load gather or "huddle" together at the center of the casing.

It will be noted that the top trunnions 18 have flat end faces (see Fig. 5), which are placed closely adjacent to the inner faces of the side walls 13 of the casing (see Fig. 3), said trunnions thus act to take up the end thrust upon the antifriction elements.

We claim as our invention:—

1. In an antifriction bearing, a casing having an integral top wall, side walls and end walls, the side walls being provided on their inner faces with longitudinally extending grooves and the end walls having openings in line with said grooves, and removable bars capable of insertion through the end walls into said grooves, said bars projecting from the inner faces of the side walls to constitute rails and having their ends bent down against the outer faces of the end walls to confine them in position, and a plurality of flat-sided antifriction elements suspended from said rails.

2. In an antifriction bearing, a casing provided at each side with upper and lower longitudinally extending rails and an antifriction element having upper and lower trunnions associated with said rails, said trunnions being spaced apart a distance less than the vertical distance between said rails.

3. In an antifriction bearing, a casing having an integral top wall and upper and lower longitudinally extending rails at each side, the upper rails consisting of removable bars, and a plurality of flat sided antifriction elements, each antifriction element having upper and lower trunnions associated with said rails, said trunnions being spaced apart distances less than the vertical space between said rails.

4. In an antifriction bearing, in combination with a casing, a plurality of flat sided, closely spaced antifriction elements suspended pendulum-wise in said casing, each end antifriction element being provided with an overweight extension at or near its bottom on the side next the end of the casing.

5. In an antifriction bearing, a casing provided with longitudinally extending rails, a plurality of flat sided closely spaced antifriction elements provided with trunnions located above their centers of gravity adapted for engagement with said rails, each end antifriction element having a lateral overweight extension on the side adjacent the end of the casing.

6. In an antifriction bearing, a casing, a plurality of flat sided closely spaced antifriction elements provided with trunnions above their centers of gravity in said casing, said antifriction elements being capable of limited oscillatory movement in said casing when transmitting load and longitudinally extending rails in said casing which are inclined downwardly toward the center of said casing, said rails being adapted to be engaged by said trunnions after said antifriction elements have been released from transmitting load to return said elements to their predetermined vertical positions and to permit sliding movement of said antifriction elements on said rails toward each other to center the same relative to said casing.

7. In an antifriction bearing, a casing provided with longitudinally extending rails, said rails being downwardly inclined toward the center of the casing, a plurality of flat sided, closely spaced antifriction elements provided with trunnions above their centers of gravity adapted for engagement with said rails, each end antifriction element having a lateral overweight extension at or near its bottom on the side next the end of the casing.

In testimony, that we claim the foregoing as our invention we affix our signatures in the presence of two witnesses, this 14th day of April A. D. 1913.

EDWIN S. WOODS.
TORRIS H. ALFREDS.

Witnesses:
GEORGE R. WILKINS,
KARL W. DOLL.

Copies of this patent may be obtained for five cents each, by addressing the "Commissioner of Patents, Washington, D. C."